US005906029A

United States Patent [19]

Fox

[11] Patent Number: 5,906,029

[45] Date of Patent: May 25, 1999

[54] HINGE REPAIR KIT AND INSTALLATION METHOD

[76] Inventor: Larry Fox, 606 N. Dayton, Kennewick, Wash. 99336

[21] Appl. No.: 08/827,047

[22] Filed: Mar. 25, 1997

[51] Int. Cl.[6] .................... E05D 5/10

[52] U.S. Cl. .................... 16/386; 16/221; 16/273; 16/381; 16/387

[58] Field of Search .................... 16/386, 387, 381, 16/262, 273, 274, 221

[56] References Cited

U.S. PATENT DOCUMENTS

| | | | |
|---|---|---|---|
| 3,421,177 | 1/1969 | Broghammer | 16/386 |
| 3,451,124 | 6/1969 | Steiner et al. | 16/273 |
| 4,078,276 | 3/1978 | Nunes | 16/273 |
| 4,353,146 | 10/1982 | Brockhaus | 16/387 |
| 4,383,478 | 5/1983 | Jones | 16/273 |
| 4,575,898 | 3/1986 | Carlson et al. | 16/274 |
| 4,575,914 | 3/1986 | Armida et al. | 16/274 |
| 4,654,929 | 4/1987 | Fahnders et al. | 16/261 |
| 5,408,785 | 4/1995 | Heim et al. | 49/502 |

*Primary Examiner*—Chuck Y. Mah
*Attorney, Agent, or Firm*—Floyd E. Ivery

[57] ABSTRACT

The present invention relates in particular to the refurbishment of automotive or similar vehicular door hinges or the refurbishment of worn hinges in general Automotive door hinges specifically for “F” Body vehicles manufactured by General Motors and generally for automotive door hinges originally constructed as non-repairable riveted assemblies are subject to load related elongation of hinge bushing apertures thereby causing doors to sag. The present disclosure is of a kit permitting the repair of worn hinges without replacement of the entire hinge assembly and the method of repair.

1 Claim, 6 Drawing Sheets

HINGE REPAIR KIT AND INSTALLATION METHOD

FIELD OF THE INVENTION

The present invention relates generally to the repair of worn hinge assemblies and relates in particular to a kit for the repair of hinges and more particularly the refurbishment of automotive and similar vehicular door hinges with specific application to the door hinges for "F" Body automobiles manufactured by General Motors®.

BACKGROUND OF THE INVENTION

Automotive door hinge assemblies, including as an example the assemblies utilized in General Motors "F" Body vehicles, are subject to wear including the elongation of hinge portion rivet/bushing apertures thereby causing hinge portions to separate resulting in the sagging of the car or vehicle door. Such assemblies are frequently welded to the door, as a part of the original manufacturing process, thus requiring significant effort in disassembly and skill for the attachment of an entire new assembly. Repair parts including repair kits, separate from the hinge assembly in its entirety, are not known to be available which address the issue as in the present disclosure Thus the repair of worn hinges in particular on the "F" Body vehicle manufactured by General Motors® requires the purchase of a new hinge assembly, the removal and disassembly of the vehicle door, the grinding or cutting off of the defective door hinge and the alignment and welding of the replacement hinge, assembly to the door. This process is time consuming and expensive and requires substantial attention and skill in alignment in order to insure the proper positioning of the vehicle door obtaining proper alignment in the installation of a new hinge assembly requires orientation around three axes of roll, pitch and yaw and in the thickness of the substructure to which the assembly will be attached. These considerations pose problems for all after market door hinge replacement; it is only the original equipment manufacturer who has the appropriate jigging machine who can reasonably attach such a hinge assembly U.S. Pat. No. 4,654,929 to Fahnders discloses a repair assembly consisting principally of the insertion of a bearing block in a door's lower hinge. U.S. Pat. No. 5,408,785 to Heim discloses a different approach than used for "F" Body vehicles wherein hinges are assembled with a door frame which is manufactured separate from a door outer skin. Both patents are disclosed in the associated Information Disclosure Statement in accordance with 37 CFR 197.

SUMMARY OF THE INVENTION

In accordance with the present invention, a Hinge Repair Kit composed of a sleeve/bushing assembly and shoulder bolt/hinge pin is disclosed. The Hinge Repair Kit disclosed herein pertains in particular to 1981–1992 General Motors Chevrolet Camaro and Pontiac Firebird ("F" Body) vehicles with the concept applying generally to non-repairable riveted hinge assemblies.

Door hinges, provided as original equipment, for the "F" Body vehicle are comprised of an upper and lower hinge assembly. The upper hinge assembly is comprised of an inner hinge portion, which is welded to the vehicle door, and an outer hinge portion. The inner hinge portion is connected via rivets and bushings, received into inner and outer hinge portion rivet/bushing apertures, to the outer hinge portion which in turn is bolted to the vehicle body. The inner and outer hinge portions, when in proper alignment, have a hinge aperture axis passing centrally through the inner and outer hinge portion rivet/bushing apertures.

A combination of factors including weight of the doors, lack of suitable lubrication method and insufficient load bearing areas, causes the hinge portion rivet/bushing aperture, in the hinge assembly, to become elongated with use causing both the door to sag and increasing wear of other components including the door latch, striker pin, and lower hinge assembly. The hinge bushing for the lower hinge assembly also becomes elongated. However, the lower hinge assembly is not connected via rivets to an outer hinge portion and hence may be repaired with available replacement pins and bushings.

The preferred embodiment of the Hinge Repair Kit apparatus disclosed herein is comprised of a sleeve/bushing assembly composed of a tubing section of the same material as the hinge, for ease of welding, with first and second bushings having bearing bores, composed in the preferred embodiment of bronze, press fitted into each end of the tubing. The first and second bushing bearing bores are substantially circular in cross section and are concentrically positioned relative to the tubing section bore, and when installed, the hinge aperture axis. The first and second bearing bores will receive the shoulder bolt/hinge pin. Lubrication means is provided for lubrication of the tubing section inner surface and or the bearing means and may be provided, as shown herein, with at least one grease fitting which is fixed into the tubing, and if necessary, through the bushing means to permit lubrication. A shoulder bolt/hinge pin, which is substantially cylindrical is received into the tubing section and through the first and second bearing bores, will secure the sleeve/bushing assembly in joining the inner and outer hinge portions in concluding the installation of the apparatus.

In an alternative embodiment the tubing section inner surface will be a bearing surface or will provide bearing means. In this embodiment the shoulder bolt/hinge pin will be received into the tubing section bore. The shoulder bolt/hinge pin will bear against the tubing section bore or bearing means at the tubing section inner surface.

The first step in making the repair is removing the "F" Body car door by unbolting the door from the vehicle door post. The rivet heads of the damaged upper hinge are ground off permitting the rivets and elongated hinge bushings to be punched out of the inner and outer hinge portion rivet/bushing apertures and thus permitting the separation of the inner and outer hinge portions. The first and second inner hinge portion surface proximal to the first and second inner hinge portion rivet/bushing apertures are prepared for welding. The sleeve/bushing assembly is positioned between the first and second inner hinge portion rivet/bushing apertures for welding to the inner hinge portion. The sleeve/bushing assembly is welded into place positioned to provide proper door alignment and in an orientation allowing access to the grease fitting after installation. The inner and outer hinge rivet/bushing apertures are then aligned permitting insertion of the shoulder bolt/hinge pin, with bronze thrust washers which limit vertical movement of the outer hinge portion between the inner and outer hinge portions aligned with the inner and outer hinge rivet/bushing apertures, through the inner and outer hinge rivet/bushing apertures and tubing section bore. The shoulder bolt/hinge pin nut is affixed to the shoulder bolt/hinge thread end and tightened and the shoulder bolt/hinge nut end and shoulder bolt/hinge pin nut are tack welded to the outer hinge portion to prevent movement of the shoulder bolt/hinge pin in the outer hinge portion rivet/bushing aperture. Lubricant is applied via the grease fitting and the door is re-installed.

This present disclosure provides for “F” Body hinge repair in approximately 1 hour or less in comparison to the four to five hours required for the removal of the existing hinge assembly and the installation of an entire new hinge assembly. This disclosure eliminates the difficult and critical hinge alignment required in the process of installing an entire new hinge assembly. This disclosure provides an approximate six fold increase in the bearing surface for the shoulder bolt/hinge pin over that provided for the rivet/bushing in the original “F” Body door hinge and additionally provides for ease of lubrication thus greatly reducing the likelihood of elongation of the sleeve/bushing aperture and thus repeated hinge failure. Additionally, this disclosure restores and maintains proper door alignment thus reducing the occurrence of secondary damage to other door parts and assemblies. This disclosure obviously may be adapted to provide for the repair and refurbishment of hinge assemblies in addition to that found on “F” Body automotive vehicles.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DETAILED DESCRIPTION

Figure 1:
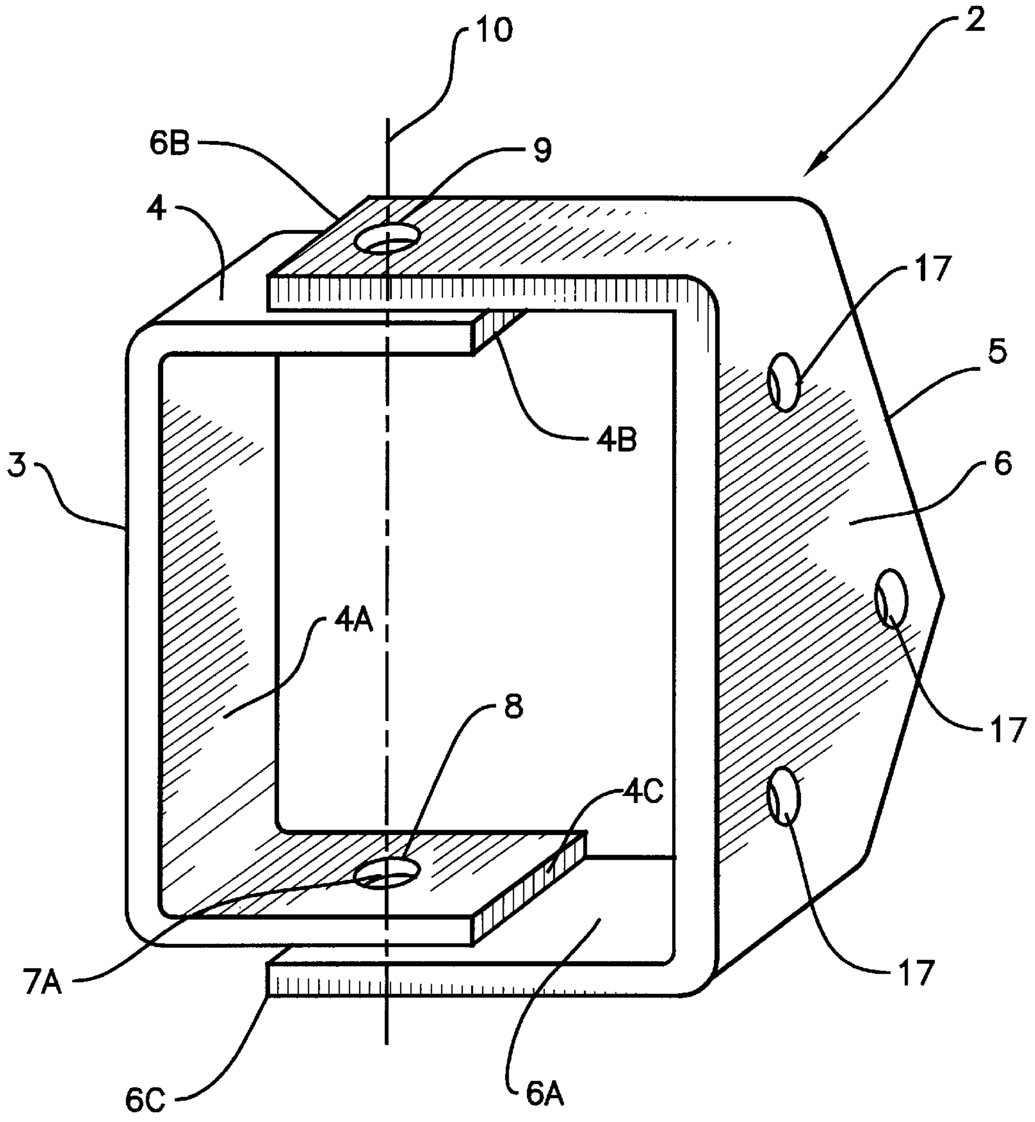
FIG. 1 is a perspective view of the “F” Body door hinge assembly showing the inner and outer hinge portions, the inner and outer hinge portion rivet/bushing apertures and bolt apertures.
Figure 1A:
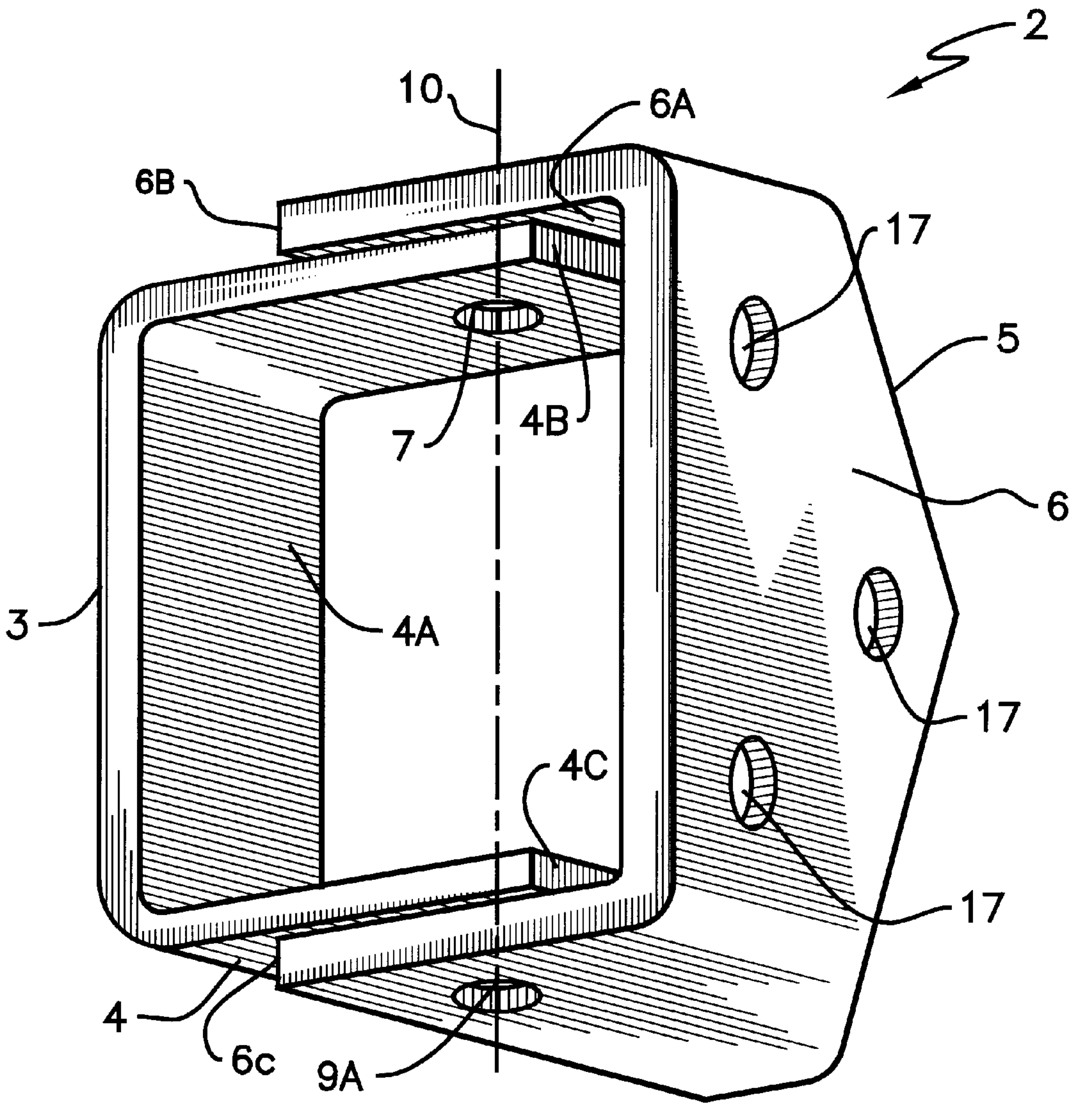
FIG. 1A is a second perspective view of the “F” Body door hinge assembly rotated from the position of FIG. 1 showing the inner and outer hinge portions, the inner and outer hinge portion rivet/bushing apertures and bolt apertures.
Figure 2:
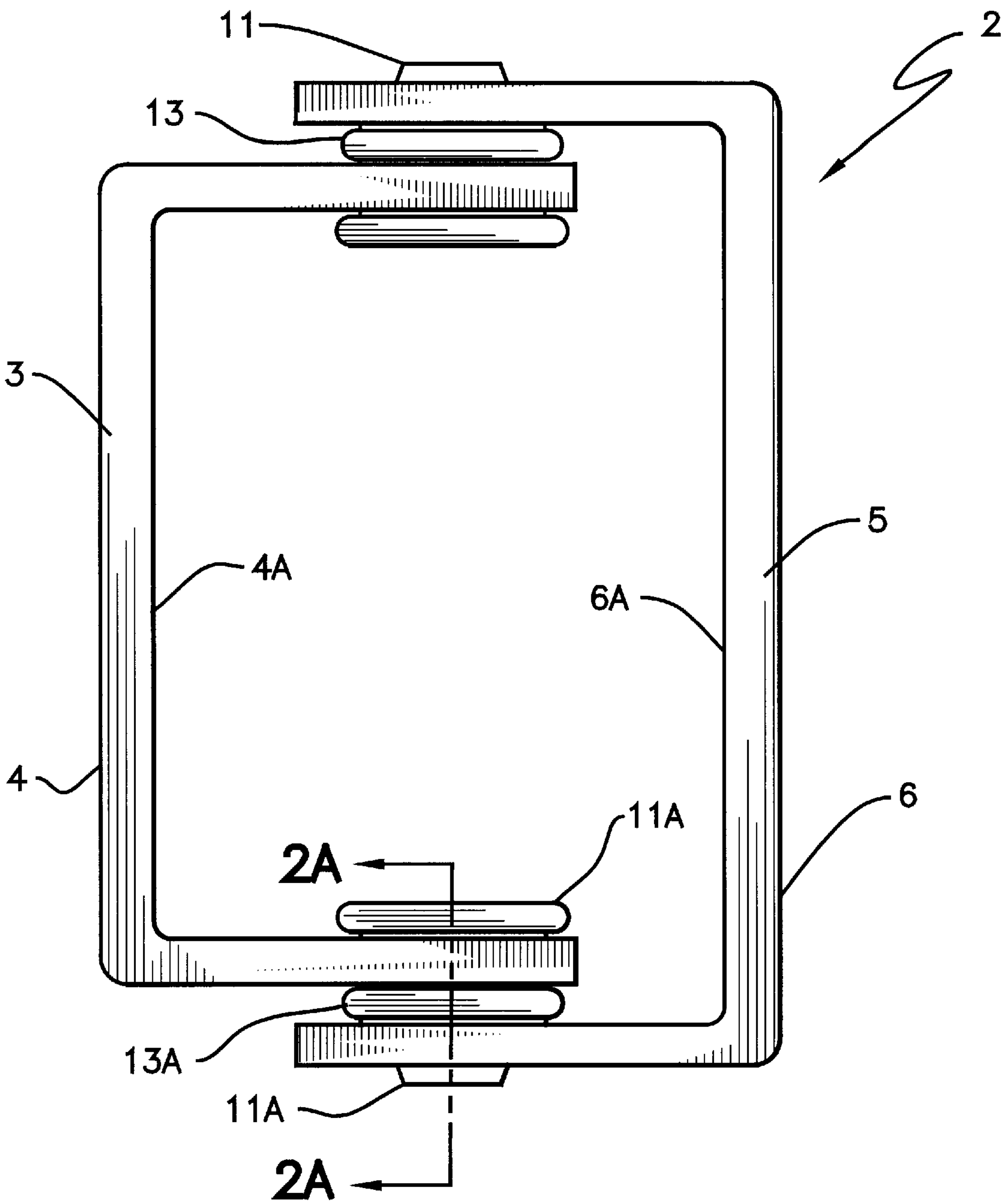
FIG. 2 a view of the “F” Body door hinge assembly showing rivet and hinge bushing which must be removed to permit installation of the sleeve/bushing assembly and shoulder bolt/hinge pin.
Figure 2A:
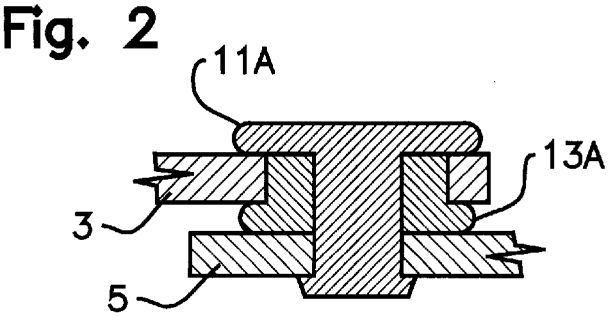
FIG. 2A is a section view showing the rivet and hinge bushing only, without hinge portions, at Section 2A—2A of FIG. 2.
Figure 5:
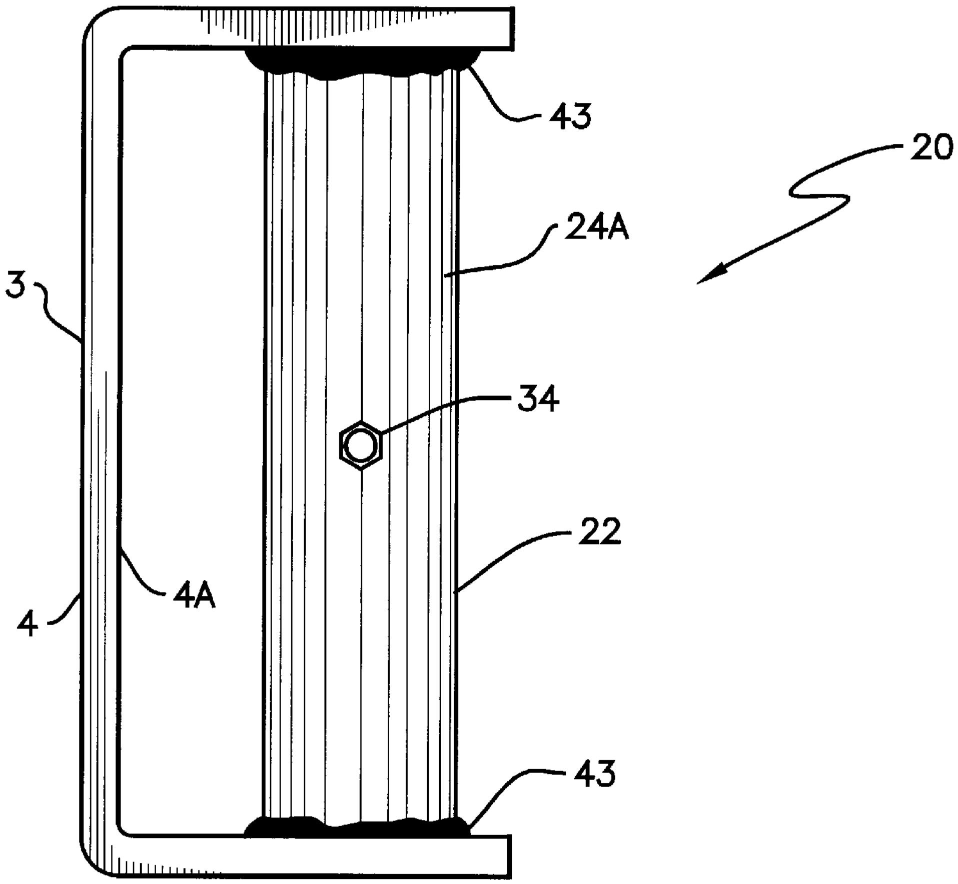
FIG. 5 is a view of the sleeve/bushing assembly affixed to the first inner hinge portion surface by shoulder bolt/hinge pin tack welds showing the tubing section with grease fitting.
Figure 5A:
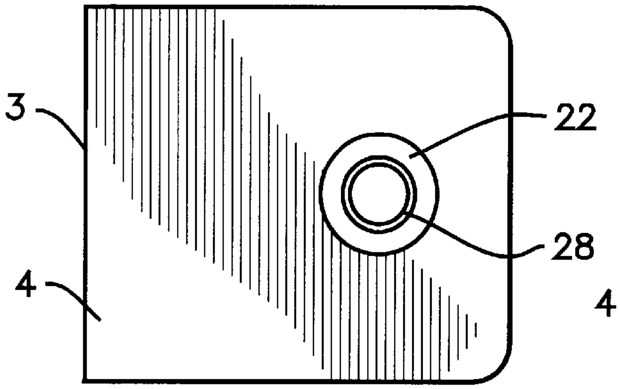
FIG 5A is a top view of the inner hinge portion with tubing section in place.
Figure 5B:
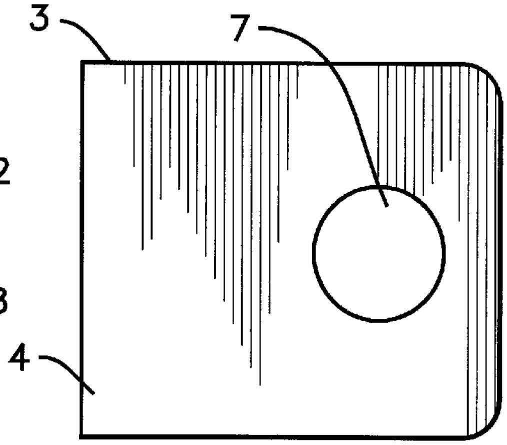
FIG. 5B is a top view of the inner hinge portion showing the inner hinge portion rivet/bushing aperture which accepts the tubing section.
Figure 6:
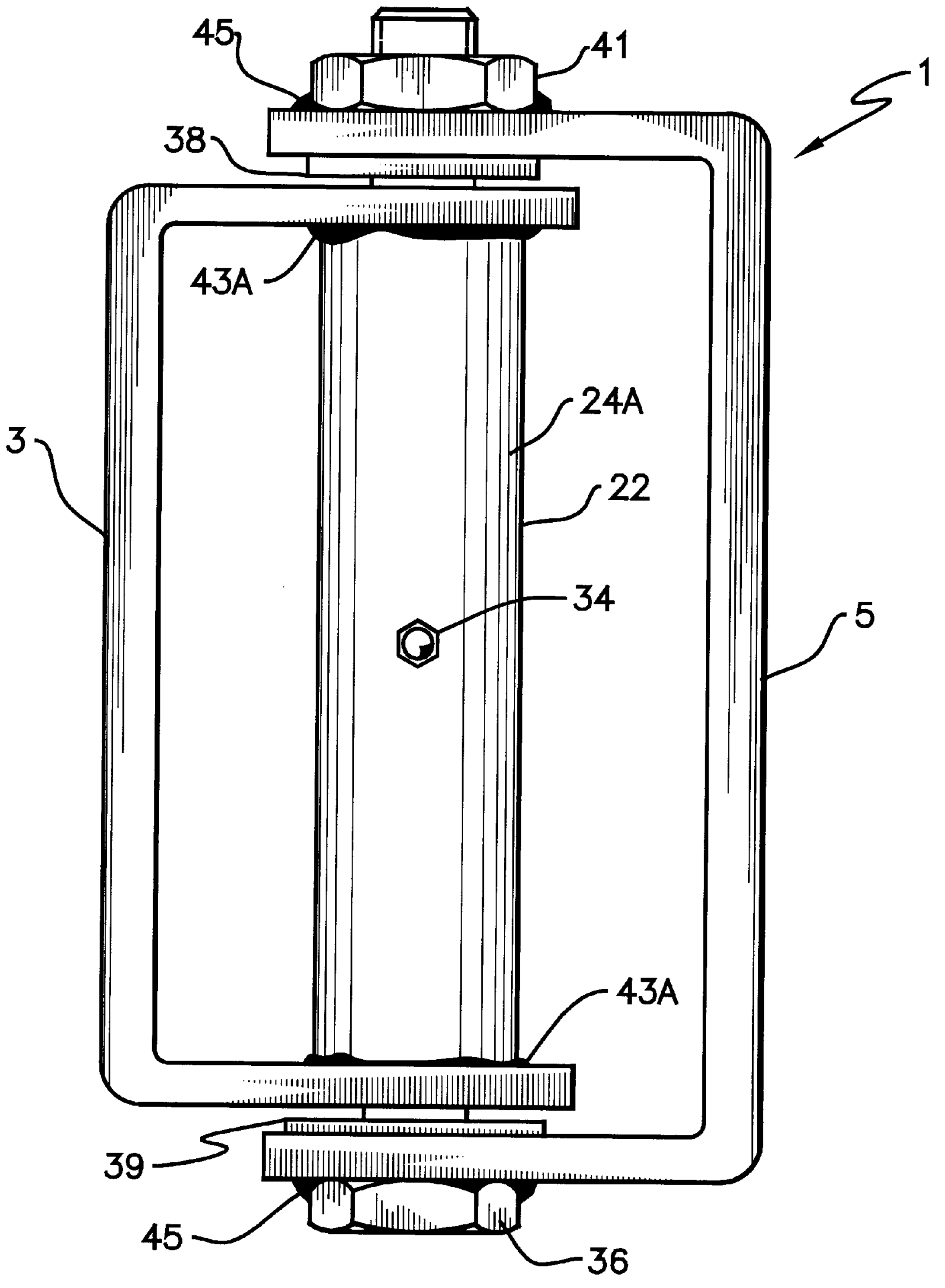
FIG. 6 is an elevation view of the “F” Body hinge assembly with hinge repair kit assembled and in place demonstrating the final assembly of the sleeve/bushing assembly by welding the tubing section to the inner hinge portion second surface and tack welding the shoulder bolt/hinge nut end and shoulder bolt/hinge pin nut to the outer hinge portion first surface.

The Hinge Repair Kit 1 assembly, shown assembled in FIG. 6 and as components of the sleeve/bushing assembly 20 and shoulder bolt/hinge pin in FIGS. 3, 3A 3B, 3C, 4, 4A, 4B, 5, 5A and 5B illustrates and is the preferred embodiment of the Hinge Repair Kit 1 disclosed. A “F” Body door hinge assembly 2, to be repaired is shown in the original configuration as installed in the manufacture of the automobile in FIG. 2. The body door hinge assembly 2 is composed of an inner hinge portion 3 having a first and second inner hinge portion surface 4, 4A and first and second inner hinge portion ends 4B, 4C; an outer hinge portion 5 having a first and second outer hinge portion surface 6, 6A and first and second outer hinge portion ends 6B, 6C; and the inner hinge portion 3 having a first and second inner hinge portion rivet/bushing aperture 7, 7A therein positioned respectively proximal to the first and second inner hinge portion ends 4B, 4C penetrating from the first to the second inner hinge portion surfaces 4, 4A; and the outer hinge portion 5 having a first and second outer hinge portion rivet/bushing aperture 9, 9A therein positioned respectively proximal to the first and second outer hinge portion ends 6B, 6C penetrating from the first to the second outer hinge portion surfaces 6, 6A. The inner and outer hinge portions are aligned so that a hinge aperture axis 10 passes through the center of the first outer hinge portion rivet/bushing aperture 9, the first inner hinge portion rivet/bushing aperture 7, the second inner hinge portion rivet/bushing aperture 7A and the second outer hinge portion rivet/bushing aperture 9A. Hinge bushings 13, 13A separate the Inner and outer hinge portions 3, 5 with a separate hinge bushing 13 received respectively into the first and second inner hinge portion rivet/bushing apertures 7, 7A. Rivet means secures the Inner and outer hinge portions 3, 5 at the first and second inner and outer hinge portion rivet/bushing apertures 7, 7A, 9, 9A, with the means recognized herein for the “F” Body hinge being rivets 11, 11A with a separate rivet 11, 11A received respectively through the first outer and first inner hinge portion rivet/bushing apertures 7, 9 and intervening hinge bushing 13 and the second outer and second inner hinge portion rivet/bushing apertures 7A, 9A and intervening hinge bushing 13A. The Inner hinge portion 3 is welded to the vehicle door while the outer hinge portion 5 is bolted to the vehicle body by bolts passing through bolt apertures 17 in the outer hinge portion 5.

The initial steps in accomplishing the repair of the “F” Body hinge, usually required as the result of elongation of the second inner hinge portion rivet/bushing aperture 7A, is the removal of the vehicle door from the vehicle body by grinding off the heads of the rivets 11, 11A and punching the rivets 11, 11A and hinge bushings 13, 13A from the first and second inner and outer hinge portion rivet/bushing apertures 7, 9, and 7A, 9.

Figure 3:
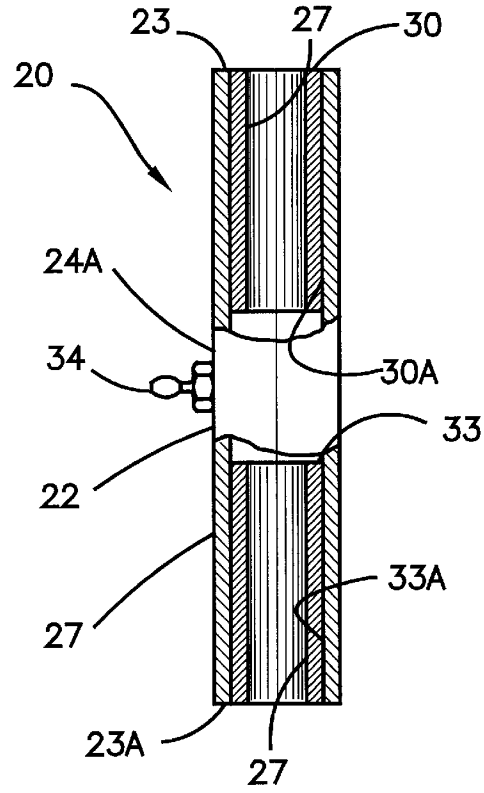
FIG. 3 is a partial cutaway view of the sleeve/bushing assembly demonstrating the tubing section, grease fitting and first and second bushing demonstrating the tubing section bore load surface.
Figure 3A:
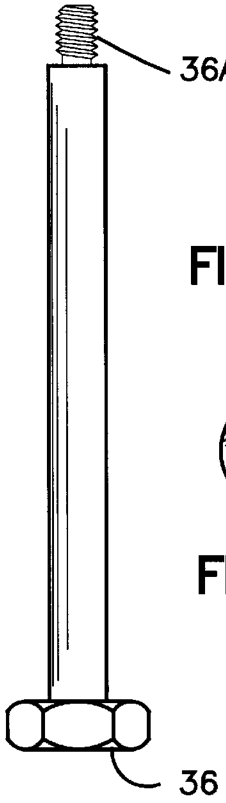
FIGS. 3A, 3B and 3C show the shoulder bolt/hinge pin, first and second bronze thrust washers and shoulder bolt/hinge pin nut.
Figure 3C:
Figure 3B:
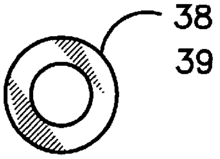
Figure 4A:
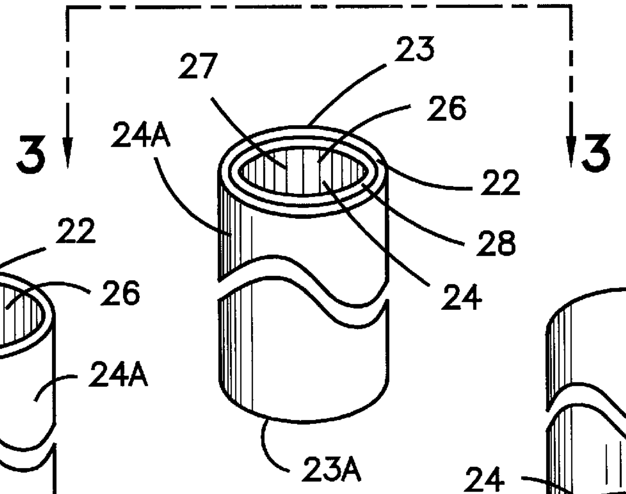
FIG. 4A is a perspective view of the tubing section showing the construction of the tubing section first end with first bushing in place.
Figure 4:
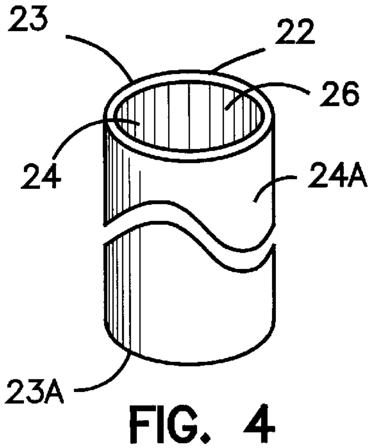
FIG. 4 is a perspective view of the tubing section showing ie tubing section first and second ends, the tubing section inner and outer surfaces and the tubing section bore.
Figure 4B:
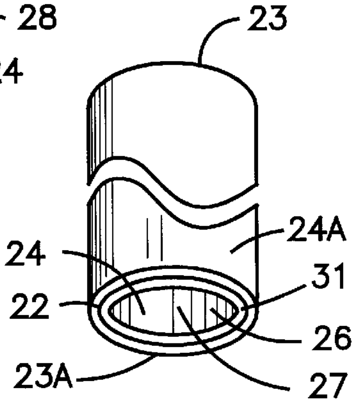
FIG. 4B is a perspective view of the tubing section showing the construction of the tubing section second end with second bushing in place.

The repair is continued with the preparation, by grinding and removal of oxides and foreign materials, of the second inner hinge portion surface 4A for the attachment by welding of the sleeve/bushing assembly 20, shown in FIG. 3, into the position as shown in FIG. 5. The sleeve/bushing assembly 20 is composed of a substantially cylindrical tubing section 22 having an inside and outside diameter, shown in FIGS. 3, 4, 4A, 4B, 5 and 6, which has a tubing section first and second end 23, 23A, a tubing section bore 26 therein extending from the tubing section first to second end 23, 23A, a tubing section inner and outer surface 24, 24A. The tubing section inner surface 24 may serve as a bearing surface and may have bearing means affixed or inserted including, for example, at least one bushing. The bearing means provided, for example in the instant disclosure, is by at least one or more bronze bushings. The bearing means will be such as to be contained within the tubing section, will have a first and second end, a bearing bore therein from the first to the second end to receive the shoulder bolt/hinge and a bearing bore load surface upon which the shoulder bolt/hinge pin will bear. The bearing means may be provided by other materials such as plastics or Teflon® or other bushing material.

In the present preferred embodiment bearing means is provided by two substantially cylindrical first and second bushing 28, 31 which have inside and outside diameters, first bushing first and second ends 30, 30A and second bushing first and second ends 33, 33A. Bearing bores 27 extend from the first bushing and second bushing first to second ends 30, 30A. The inside surfaces of the first and second bushings 28, 31 composes the bearing bore load surface 27. The outside diameter of the first and second bushing 28, 31 is slightly greater than the inside diameter of the tubing section 22 enabling a press fit. The first and second bushings 28, 31 are substantially the same length such that twice the length of either the first or second bushing 28, 31 is less than the overall length of the tubing section 22.

The first and second bushings 28, 31 are inserted into the tubing section bore 26 such that the first bushing second end 30A is received into the tubing section bore 26 at the tubing section first end 23 so that the first bushing first end 30 is flush with the tubing section first end 23; the second bushing first end 33 is received into the tubing section bore 26 at the tubing section second end 23A so that the second bushing second end 33A is flush with the tubing section second end 23A; the outside diameters of the first and second bushings 28, 31 are dimensioned in relation to the inside diameter of the tubing section 22 so as to allow no movement relative to the tubing section 22. When the first and second bushing 28, 31 are in position within the tubing section bore 26 a space exists between the first and second bushings 28, 31, located substantially equidistant from the tubing section first and second ends 23, 23A, with at least one grease fitting aperture 34A therein from the tubing section inner to outer surface 24, 24A which receives at least one grease fitting 34 for the purpose of applying lubrication into the tubing section bore 26, upon the tubing section bore surface 24, upon the surfaces of the first and second bushings 28, 31 and other components composing the sleeve/bushing assembly 20.

A hinge pin means will be received into the tubing section bore at the first or second tubing section end and will be secured within the tubing section bore, provided for example as in this embodiment by a bolt forming a shoulder bolt/hinge pin 35 having a shoulder bolt/hinge nut and thread end 36, 36A and having an outside diameter. The shoulder bolt/hinge pin 35 outside diameter is less than the inside diameters of the first and second bushing 28, 31.

The length of the sleeve/bushing assembly 20 is dimensioned to be received by the inner hinge portion 3 at the second inner hinge portion surface 4A such that the tubing section first and second ends 23, 23A are essentially concentrically aligned respectively with the first and second inner hinge portion rivet/bushing apertures 7, 7A and the hinge aperture axis 10. The tubing section bore 26 is generally concentrically positioned relative to the hinge aperture axis 10. When in position for welding, the tubing section first and second end 23, 23A are in sufficient contact with the second inner hinge portion surface 4A to accommodate the welding of the tubing section 22 to the section inner hinge portion surface 4A. The sleeve/bushing assembly 20 comprised of the tubing section 22 with installed first and second bushings 28, 31 is welded to the second inner hinge portion surface 4A with a shoulder bolt/hinge pin tack weld 43.

With the tubing section 22 tack welded to the inner hinge portion 3 the outer hinge portion 5 is positioned so that the first and second outer hinge portion rivet/bushing apertures 9, 9A are aligned concentrically respectively with the first and second inner hinge portion rivet/bushing apertures 7, 7A and the hinge aperture axis 10

The sleeve/bushing assembly 20 installation is completed with the following steps: a first bronze thrust washer 38 is positioned between the inner and outer hinge portions 3, 5 concentric with the hinge aperture axis 10 and the first inner hinge portion rivet/bushing aperture 7 and the first outer hinge portion rivet/bushing aperture 9; a second bronze thrust washer 39 is positioned between the inner and outer hinge portions 3, 5 concentric with the hinge aperture axis 10 and the second inner hinge portion rivet/bushing aperture 7A and the second outer hinge portion rivet/bushing aperture 9A; the shoulder bolt hinge thread end 35 is received by the thread end 36A into the second outer hinge portion rivet/bushing aperture 9A through the second bronze thrust washer 39, the second inner hinge portion rivet/bushing aperture 7A, the second and first bushings 28, 31, and respectively the first inner hinge portion rivet/bushing aperture 7, the first bronze thrust washer 38 and the first outer hinge portion rivet/bushing aperture 9. The relative dimensions of the shoulder bolt/hinge pin outside diameter and the first and second bushing inner diameters are such as to allow appropriate mechanical bearing between the shoulder bolt/hinge pin 35 and the bearing bore load surface 27. With the shoulder bolt/hinge pin 35 in place the shoulder bolt/hinge nut end 36 abuts the first outer hinge portion surface 6 and is affixed by means, including in this disclosure welding via a shoulder bolt/hinge pin nut tack weld 45, to the first outer hinge portion surface 6. A threaded shoulder bolt/hinge pin nut 41 is received by the threads of the shoulder bolt hinge thread end 36A so that the shoulder bolt/hinge pin nut 41 abuts the first outer hinge portion surface 6 and is affixed by means, including in this disclosure welding via a shoulder bolt/hinge pin nut tack weld 45, to the first outer hinge portion surface 6. The tubing section first and second ends 23, 23A are then secured with means, including herein with welding 43A, to the second inner hinge portion surface 4A, thus concluding the installation of the Hinge Repair Kit 1 and the repair of the damaged "F" Body door hinge assembly 20

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An apparatus of a hinge repair kit for repairing an "F Body" vehicle upper door hinge comprising:

A. a sleeve/bushing assembly composed of a substantially cylindrical tubing section having an inside diameter and an outside diameter, a first end and a second end, a bore therein extending from the first end to the second end and an inner surface and an outer surface, a bearing means at the tubing section inner surface;

B. a hinge pin means received in said bore and having means to be secured within the tubing section bore by securing means; the hinge pin means bearing on the bearing means at the tubing section inner surface;

C. lubrication means on said tubing to provide lubrication to the inner surface, bearing means and hinge pin means;

D. the bearing means at the tubing section inner surface is composed of substantially cylindrical first and second bushings each of which has inside and outside diameters, and first and second ends; a bearing bore extending from the first end to the second end; the outside diameters of the first and second bushings are slightly greater than the inside diameter of the tubing section; the first and second bushings are substantially the same length such that twice the length of either the first or second bushing is less than the overall length of the tubing section;

E. the hinge pin means comprised of a bolt having a nut end and a thread end and a nut means for securing said pin within said bore;

F. wherein said "F Body" vehicle upper door hinge having an inner hinge portion and an outer hinge portion; the inner and outer hinge portions having respectively first and second inner portion ends and first and second outer portion ends, first and second inner portion surfaces and first and second outer hinge portion surfaces, first and second inner hinge portion rivet/bushing apertures and first and second outer hinge portion rivet/bushing apertures; the first and second inner hinge portion rivet/bushing apertures are positioned respectively proximal to the first and second inner hinge portion ends and penetrating from the first to the second inner hinge portion surfaces; the first and second outer hinge portion rivet/bushing apertures are positioned respectively proximal to the first and second outer hinge portion ends and penetrating from the first to the second outer hinge portion surfaces; a hinge aperture axis passes centrally through the first and second inner and outer hinge portion rivet/bushing apertures when the inner and outer hinge portions are aligned for hinge repair; hinge bushings and rivets are received through the first and second hinge portion rivet/bushing apertures to secure the inner and outer hinge portions in the "F body" vehicle upper door hinge; the inner hinge portion is welded to the vehicle door while the outer hinge portion is bolted to the vehicle body by bolts passing through bolt apertures in the outer hinge portion;

G. wherein the rivet/bushing assembly is dimensioned to be received by the inner hinge portion at the second inner hinge portion surface such that the tubing section first and second ends are sufficiently in contact with the inner hinge portion surface to permit welding; the bushing bore is essentially concentrically aligned respectively with the first and second inner hinge portion rivet/bushing apertures and the hinge aperture axis.

* * * * *